United States Patent [19]

Fischer et al.

[11] Patent Number: 4,775,278
[45] Date of Patent: Oct. 4, 1988

[54] EMPTYING DEVICE FOR SILOS

[75] Inventors: Gerhard Fischer, Dortmund; Günter Ströcker, Holzwickede, both of Fed. Rep. of Germany

[73] Assignee: Gustav Schade Maschinenfabrik GmbH & Co., Fed. Rep. of Germany

[21] Appl. No.: 12,242

[22] Filed: Feb. 9, 1987

[30] Foreign Application Priority Data

Feb. 28, 1986 [DE] Fed. Rep. of Germany ....... 3606669

[51] Int. Cl.⁴ ............................................. B65G 65/38
[52] U.S. Cl. .................................... 414/317; 414/302; 222/410
[58] Field of Search ............... 414/317, 313, 314, 315, 414/316, 133, 302; 222/410; 198/519, 520, 512, 514, 508, 515, 516

[56] References Cited

U.S. PATENT DOCUMENTS

| | | | |
|---|---|---|---|
| 2,649,215 | 8/1953 | Dickson | 414/298 |
| 3,513,995 | 5/1970 | Stroker | 414/298 |
| 3,881,610 | 5/1975 | Hessling | 414/299 X |
| 4,284,369 | 8/1981 | Gsponer et al. | 414/313 X |
| 4,645,403 | 2/1987 | De Wit | 414/326 X |

FOREIGN PATENT DOCUMENTS

| | | | |
|---|---|---|---|
| 831519 | 1/1952 | Fed. Rep. of Germany. | |
| 125036 | 9/1967 | Fed. Rep. of Germany. | |
| 2147821 | 3/1973 | Fed. Rep. of Germany | 414/313 |
| 2214872 | 10/1973 | Fed. Rep. of Germany | 414/317 |

Primary Examiner—Frank E. Werner
Attorney, Agent, or Firm—Body, Vickers & Daniels

[57] ABSTRACT

An apparatus for emptying silos enables a telescopically retractable vertical emptying pipe to retract downwardly with an overhead material gathering conveyor in continuous controlled motion without undesirable sudden retraction of individual telescopic components. The lower portions of the telescopic pipe are rotatable about their longitudinal axis to reduce frictional contact between the telescopic members and the stored material, and gradually slide downwardly as the overhead material gathering device is lowered in the silo.

13 Claims, 4 Drawing Sheets

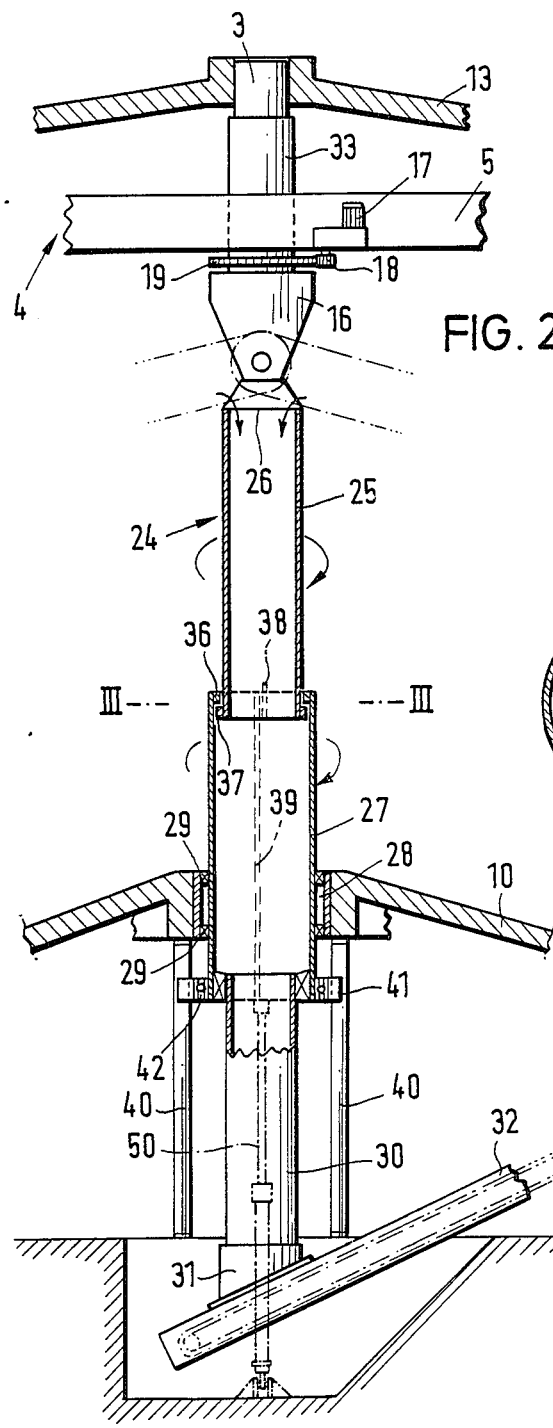
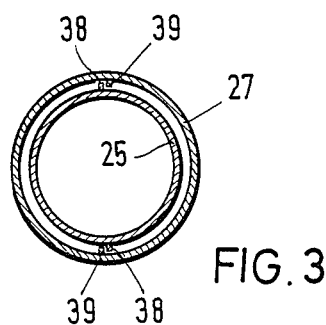
FIG. 2
FIG. 3

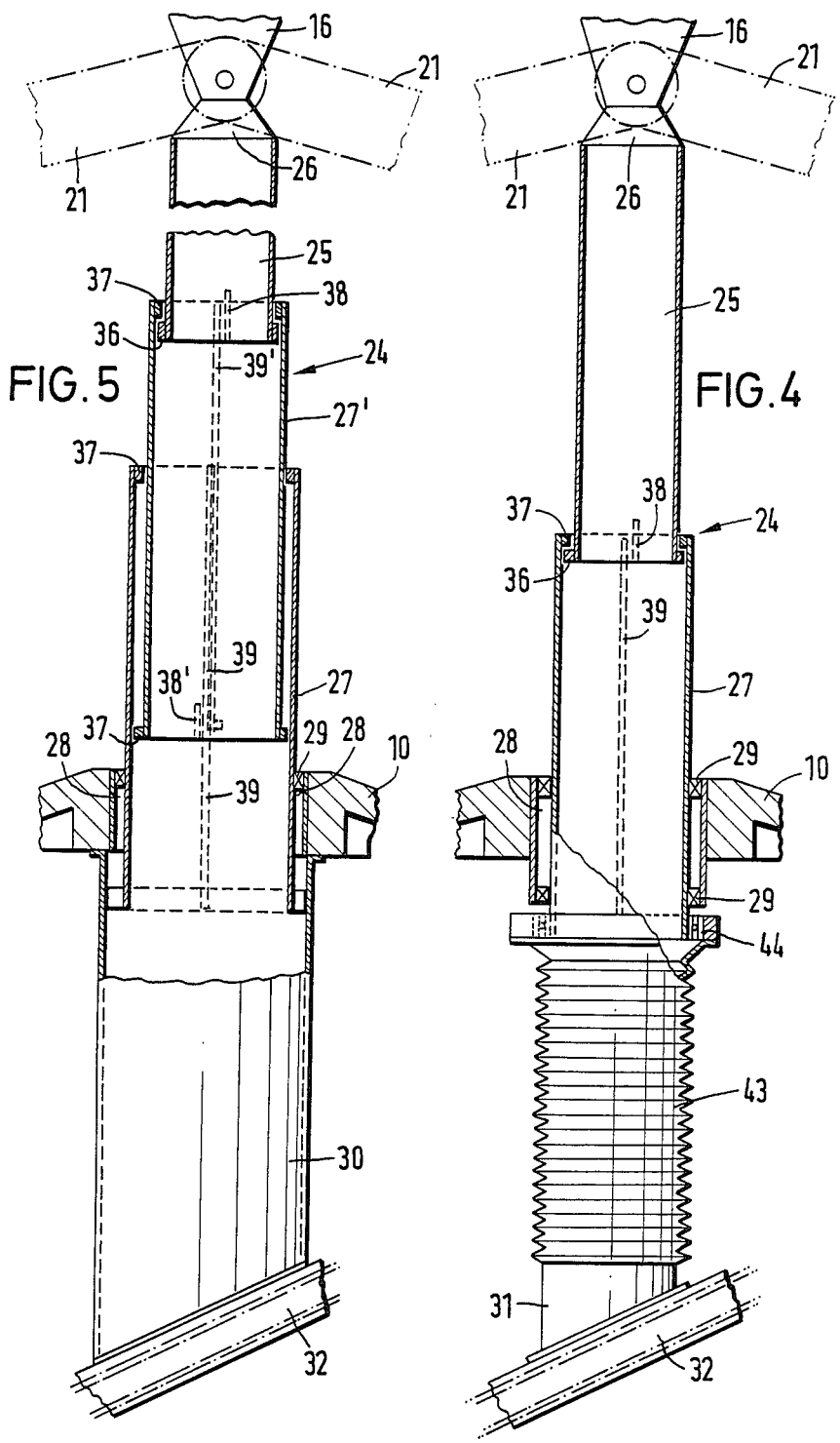

EMPTYING DEVICE FOR SILOS

The invention relates to a device for emptying bulk material from silos, having a clearing device which removes the bulk material on the upper surface of the bulk material heap, can be lifted and lowered in the silo and feeds the bulk material to a telescopic fall pipe which extends downwards through the silo and is coupled to the clearing device such that it follows the lifting movements of the clearing device by telescope-like retraction and extension, with the telescopic fall pipe having at least one lower sliding pipe and one upper coupling pipe which can be lifted relative to the lower sliding pipe, is provided with a bulk material inlet and is coupled to the clearing device.

In silos of small storage capacity which are used in agriculture for accommodating silage, it is known to provide as a delivery shaft for the stored material a telescopic fall pipe centrally in the silo, the upper pipe of which bears a clearing arm, pivotable about the silo axis, and is provided with an inlet for the stored material conveyed by the clearing arm (German Auslegeschrift No. 1,250,360). At the same time, the upper pipe forms a coupling pipe with which the retracted telescopic fall pipe, together with the clearing unit, is pulled back upwards in the silo by means of a winch rope. Here, the coupling pipe consists of two pipe parts which are connected via a rotary connection and of which the upper pipe part, which has the lateral bulk material inlet, rotates with the clearing arm.

In another known silo-emptying device which is intended for discharging lumps of ice, a telescopic fall pipe is used as a delivery shaft, leading with its pipes to a fixed stand pipe (German Patent Specification No. 831,519). Here, too, this is a small silo.

The known silos having a central delivery shaft designed as a telescopic fall pipe have been unable to establish themselves in practice for bulk material silos of larger storage capacities. A difficult problem with these devices is that the telescopic movements of the telescopic pipe standing in the stored material cannot be reliably controlled in use. When the clearing unit is lowered in the silo, the telescopic fall pipe is certainly forced to retract, but at the same time it is unable to reliably retract gradually section by section from the bottom upwards. On the contrary, the individual pipes of the telescopic column or even entire groups of pipes the same can prematurely retract in an uncontrolled manner before the pipes lying underneath are retracted. The consequence of this is that the pipes or pipe groups which have stuck, as soon as the adhesive force at the surrounding stored material has been overcome by their dead weight, suddenly fall downwards until they strike the flange of a pipe section lying underneath. With their considerable weight, this uncontrolled falling of individual pipes or even entire pipe groups leads to very high shock loads and, as a consequence thereof, to severe vibration and serious damage to the installation. Repairs to the telescopic fall pipe standing in the stored material are exceptionally laborious and time-consuming.

Of course, the abovementioned problems occur to a considerable extent if the intention is to store in the silo bulk materials, such as, for example, gypsum, saline manure or other salts, and bulk materials comparable in behaviour, which tend to stick, compact or even harden. No bulk-material emptying devices are as yet available which are absolutely reliable for the storage of such difficult bulk materials in large silos.

The invention falls back on the proposals, which have been known for a long time but have previously not gained acceptance in practice for storing bulk material, to use a telescopic fall pipe as a delivery shaft for the bulk material to be emptied, which telescopic fall pipe is loaded from above with the bulk material by the clearing device working in the silo and conveys the material away downwards through the silo base. The object of the invention is pricipally to design a silo-emptying device of the said type, which is preferably intended for emptying the abovementioned difficult bulk materials from silos of large storage capacity, in such a way that sudden falling of individual pipes or pipe groups of the telescopic fall pipe and the risks connected herewith for the durability of the installation are reliably avoided, and at the same time to advantageously achieve this in a simplified embodiment of the telescopic fall pipe.

The abovementioned object is achieved according to the invention in that the sliding pipe of the telescopic fall pipe can be rotated about its axis by means of a rotary drive.

The invention is accordingly based on a telescopic fall pipe which has at least one sliding pipe which is indeterminate in its retraction sequence inside the telescopic column and therefore possibly retracts in an uncontrolled manner and which is connected between the coupling pipe of the telescopic fall pipe, which coupling pipe is coupled to the clearing device and is carried along by the latter both upwards and downwards, and the silo base or a stand pipe or the like arranged in fixed manner beneath the silo base above a delivery conveyor. According to the invention, this sliding pipe can be rotated about its pipe axis, as a result of which the adhesion between this pipe and the surrounding bulk material is released to the extent that the sliding pipe slides downwards under its dead weight when the telescopic fall pipe is retracted. The hazardous sticking of the sliding pipe in the bulk material heap, which involves the risk of the sliding pipe suddenly slipping through when the adhesion at the bulk material is overcome, is reliably avoided. Since in a silo of the type in question here the stored material which was stored last is the first to be emptied, the bulk material located in the lower space of the silo, which is compacted to a greater degree anyway by the bulk material being deposited on top, can possibly remain in the silo over a longer period of time, a circumstance which to a considerable extent leads to the compacting and hardening of the bulk material. It is therefore essential above all in the case of difficult bulk materials that at least the sliding pipe or sliding pipes located in the lower space of the silo can be rotated so that they can be broken away from the surrounding hardened bulk material. The upper coupling pipe forming the head of the telescopic fall pipe does not in itself need to be set in rotation because it is automatically driven along during the lifting movements by the clearing device with which it is coupled. However, there is nothing to stand in the way of coupling the sliding pipe in rotationally locked manner via a rotary coupling to the coupling pipe arranged above the sliding pipe, so that both pipes rotate together. This arrangement is especially advantageous if the rotary drive is arranged in the head area of the telescopic fall pipe and if, in this arrangement, in particular the rotary or pivot drive of the clearing unit at the same time forms the rotary drive for the sliding pipe or sliding pipes. In this connection, the coupling pipe can be coupled to a rotary member which is driven by the rotary drive and which is a bearer or a component part of at least one clearing unit, rotatable about the silo axis, such as, for example, a clearing arm or a clearing wheel. In this case, the rotary drive and the rotary member can be arranged on a lifting frame which can be lifted and lowered in the silo, is guided in rotationally locked manner with its ends on vertical guides of the silo wall and via which the reaction forces of the emptying device are dissipated on the silo wall. In this connection, the lifting frame is the bearer of both the clearing unit and the telescopic fall pipe, which, with its upper coupling pipe, is coupled in a manner resistant to compression and tension and at the same time in a rotationally locked manner to the driven rotary member of the clearing unit.

On the other hand, the rotary drive for the sliding pipe or sliding pipes can also be arranged beneath the silo base. In this case, the arrangement is expediently made such that the sliding pipe penetrates through a base opening in the silo base, with it being possible for the rotary drive arranged beneath this base opening to be lifted and lowered in synchronism with the sliding pipe. The rotary drive consists, for example, of a friction drive or peferably a gear drive. In this connection, the sliding pipe bears a toothed ring with which a pinion engages which is driven by the rotary drive. The rotary drive is expediently mounted on a bracket which is connected to the sliding pipe via a rotary connection. The weight of the rotary drive increases the dead weight of the sliding pipe and therefore helps to prevent the sliding pipe from becoming stuck in the bulk material heap. However, it is also possible to support the rotatable sliding pipe by means of at least one lifting support, preferably a lifting cylinder, which engages on the sliding pipe via a rotary connection, with it also being possible for this lifting support to be designed as a simple shock absorber which controls or dampens the downward movement of the sliding pipe when the adhesion at the surrounding bulk material is overcome, but preferably serves above all, during the upward movement of the clearing device, to ensure that the coupling pipe only moves out of the sliding pipe when the sliding pipe has reached its upper lifted end position.

Beneath its head or coupling pipe, the telescopic fall pipe can of course also have several sliding pipes as pipe sections. In this case, all sliding pipes can also be coupled via rotary couplings in a rotationally locked manner so that they can be set in rotation together either by the upper or the lower rotary drive. In the case of a rotary drive arranged beneath the silo base, the drive can be switched on and off as required, because this drive is independent of the rotary drive of the clearing unit. If rotation of the sliding pipe or sliding pipes is effected by the upper rotary drive of the clearing unit, the coupling between the coupling pipe and the rotary member can be made as a rotary coupling which can be engaged and disengaged.

In a preferred embodiment of the invention, the telescopic fall pipe has only a single sliding pipe into which the coupling pipe fits from above as a telescoping pipe and which extends through the base opening down below the silo base. At the same time, a fixed stand pipe is expediently arranged beneath the silo base between the sliding pipe, plunging through the silo base, and a delivery conveyor, which stand pipe can also be designed as bellows. This embodiment of the telescopic fall pipe with only a single sliding pipe is characterized by an especially simple type of construction which is still operationally reliable even with difficult bulk materials.

In particular with those bulk materials which tend to harden considerably, small release members, for example small teeth, ribs or cutting strips, including strips or the like which run in a helical shape, can also be provided on the outer circumference of the sliding pipe or sliding pipes, which release members increase the release effect at the surrounding bulk material during the rotary movement of the sliding pipe. In the case of strips arranged in a helical shape, the adhering bulk material can be displaced, for example, upwards in a similar manner to a screw conveyor, as a result of which the break-away effect is improved.

The invention is described below in greater detail in conjunction with the exemplary embodiments shown in the drawing, in which:

FIG. 1 shows, in a vertical section through a bulk material silo, the emptying device which is arranged in the silo and has a telescopic fall pipe;

FIGS. 2, 4 and 5 in each case show modified embodiments of the telescopic fall pipe in vertical section;

FIG. 3 shows a cross-section along line III—III in FIG. 2;

Figure 1:
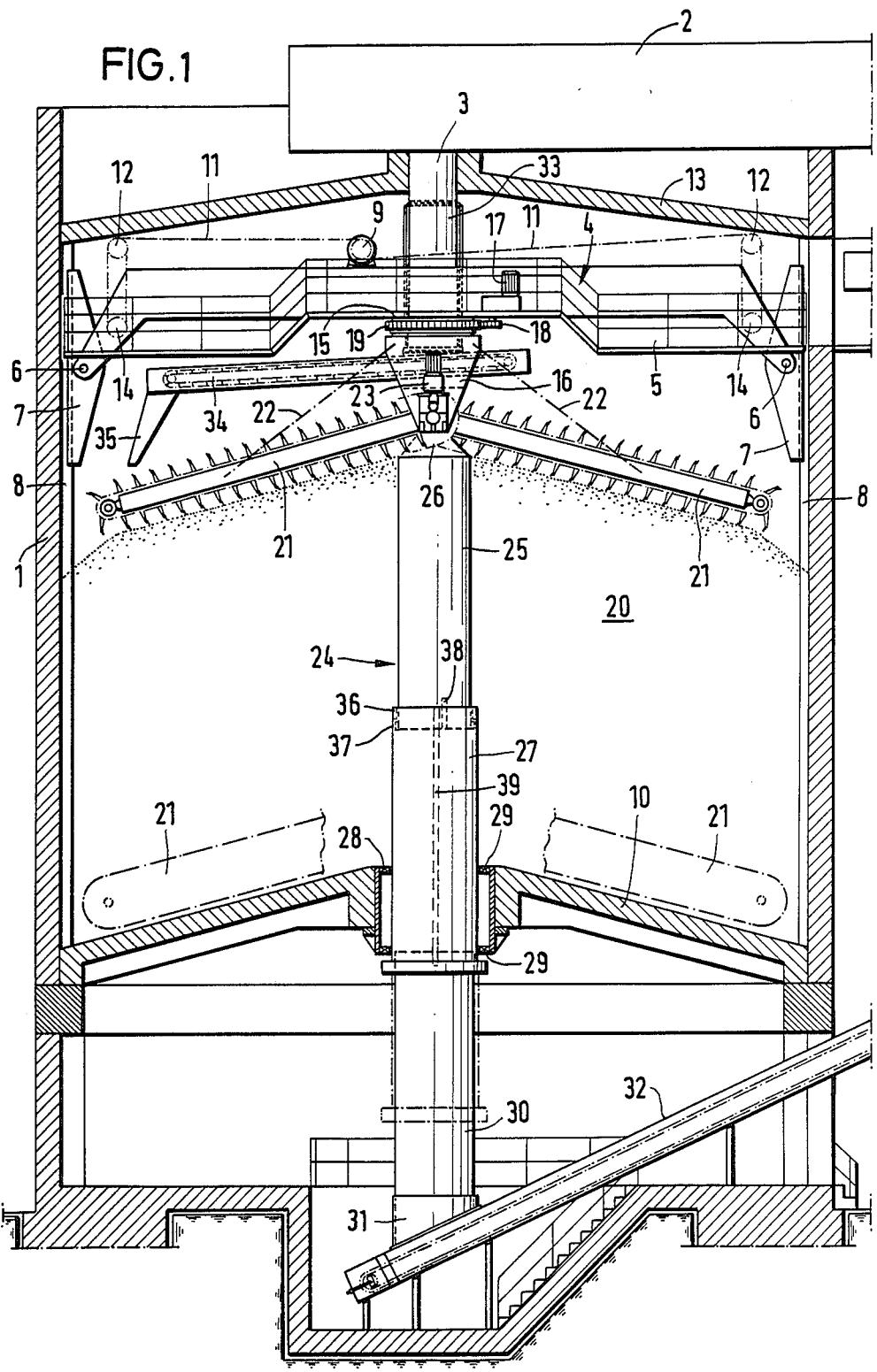

In the drawing, 1 designates a round silo which is intended as a large silo for the storage of bulk materials of different type, in particular those bulk materials which, as above all gypsum, saline manure or other salts, tend to compact, stick or even harden. A loading device 2 (not shown in greater detail) is arranged in the upper area of the silo for loading the silo 1 with the bulk material to be stored, which loading device 2 has, for example, a storing conveyor which discharges centrally into the silo 1 at 3 the bulk material to be stored.

In its main parts, the clearing device 4, which can be lifted and lowered in the silo, consists of a lifting frme 5 which is made as a bridge girder extending transversely through the silo or as a girder which is roughly cross-shaped or star-shaped in plan view and which bears sliding shoes 7 which are attached to its ends in articulations 6 and with which the entire clearing device is supported and guided in rotationally locked manner on vertical guides 8 of the cylindrical silo wall. A lifting mechanism 9 is arranged on the lifting frame 5, with which lifting mechanism 9 the entire clearing device 4 can be lowered in the silo 1 down to the silo base 10 and can be lifted from the lowered position back into the raised position shown. The lifting mechanism 9 expediently consists of at least one rope winch, the winch ropes 11 of which are guided over guide pulleys 12 on the ceiling 13 of the silo and guide pulleys 14 of the lifting frame 5.

A rotary member 16 is mounted centrally on the underside of the lifting frame 5 via a rotary connection or a slewing ring 15. The rotary drive 17 is located on the lifting frame 5; it has a driven pinion 18 which meshes with a toothed ring 19 of the rotary member 16 which can thus be rotated about the vertical axis of the silo 1. The clearing unit working on the upper surface of the bulk material heap 20 is mounted on the rotary member 16 and, in the preferred exemplary embodiment, consists of two clearing arms 21 in the form of scrapers which, at their inner ends, are mounted on the rotary member 16 in articulations (not shown) in a limited vertically pivotable manner, with it being possible for the vertical adjustment to be effected, for example, by means of a winch rope 22. One of the two drives of the clearing arms 21 is designated as 23. The scraper chain drive of the other clearing arm is concealed behind the drive 23.

Moreover, a telescopic fall pipe 24 standing in the vertical centre axis of the silo 1 is connected by its upper end to the rotary member 16, so that it is carried along by the lifting frame 5 in the up and down direction during the lifting movements or is able to follow the lifting movements by retracting and extending in the manner of a telescope. In the shown preferred exemplary embodiment of the invention, the telescopic fall pipe 24 is made of three pieces. In this case, it consists of an upper coupling pipe 25 which, at its upper end, is connected to the rotary member 16 in a manner resistant to compression and tension and in addition forms at its upper open end the bulk material inlet 26, and moreover a sliding pipe 27 adjoining the pipe 25 at the bottom, which sliding pipe 27 passes through a central base opening 28 at the silo base 10 and at the same time is expediently guided in the base opening 28 and is sealed by means of encircling seals 29, and finally a stand pipe 30 which is arranged in a fixed position beneath the silo base 10 and which, with its lower discharge end 31, lies above a rising delivery conveyor 32 which is formed, for example, by a chain scraper conveyor. The coupling pipe 25 can be pushed as a telescopic pipe into the sliding pipe 27 of larger diameter. In the exemplary embodiment according to FIG. 1, the sliding pipe 27 has the largest diameter and the stand pipe 30 the smallest diameter, so that the stand pipe 30 can also be pushed into the sliding pipe 27 and in addition the coupling pipe 25 can be pushed into the lower stand pipe 30. In FIG. 1, the lower position of the sliding pipe 27 is indicated in chain-dotted lines. In this position, the clearing arms 21 are located in the lower working position, also indicated in chain-dotted lines, at the silo base 10 which slopes outwards from the base opening 28 in order to obtain as large a storage volume as possible in the silo with adequate clearance height beneath the silo base.

The bulk material to be stored is discharged centrally from above into the silo via the loading device 2. It falls through a telescope-like storing pipe 33 which is arranged between the lifting frame 5 and the discharge point 3, is able, on account of its telescopic movements, to follow the lifting movements of the clearing device 4 and feeds the bulk material to a distribution belt 34 or the like which is arranged on the rotary member 16, rotates with the rotary member about the silo axis and at the same time discharges the fed bulk material into the silo via a chute 35. The fed bulk material can be distributed over the silo cross-section by means of the scraper chain belt of the scraper 21.

During the emptying operation, the entire clearing device 4 slowly lowers in the silo 1, which is effected by means of the lifting mechanism 9. The clearing arms 21 rotate with the rotary members 16 about the silo axis; they convey inwards the bulk material on the upper side of the bulk material heap 20 and, at their inner ends, throw it into the upper inlet opening 26 of the coupling pipe 25. The bulk material falls downwards in the telescopic fall pipe 24 and can at the same time be carried away via the rising delivery conveyor 32.

During the lowering movement of the clearing device 4 in the silo 1, a condition must be prevented from occurring during the telescope-like retraction of the fall pipe 24, in which condition the sliding pipe 27 can fall freely downwards as soon as its dead weight exceeds the holding force with which the sliding pipe is held in the surrounding stored material. Such an unstable condition of the sliding pipe 27 results, for example, when the coupling pipe 25 pushes into the raised sliding pipe 27 when the silo is being emptied. The sliding pipe 27 can then fall downwards by the extent to which the coupling pipe 25 has been oushed in, with it butting with its inner flange 36, arranged at the upper end, against the outer flange 37 fixed to the lower end of the coupling pipe 25.

In order to avoid the abovementioned unstable condition of the sliding pipe 27, provision has to be made first of all for both pipes 25 and 27, during the lowering movement of the clearing device 4 from its raised position shown in FIG. 1, to be lowered together in the pushed-out condition until the sliding pipe 27 has reached the lower lifting position indicated in chain-dotted lines in FIG. 1, with the coupling pipe 25, during the further course of the lowering movement of the clearing device 4, now pushing into the lowered sliding pipe 27. When the clearing device 4 is being raised up in the silo 1, the coupling pipe 25 first of all pushes out of the sliding pipe 27 until it carries the sliding pipe with it via the stop of the flanges 36 and 37. In the exemplary embodiment shown in FIG. 1, the upper coupling pipe 25 is coupled to the rotary member 16, driven by the rotary drive 17, in such a way that it participates in the rotary movement of the rotary member. The rotary movement of the coupling pipe 25 is transmitted to the lower sliding pipe 27 via a rotary coupling. As indicated just by broken lines in FIG. 1, the rotary coupling consists of stop strips 38 and 39 firmly arranged on the pipes 25 and 27. The stop strips 38 are fixed to the outer wall of the coupling pipe 25 and extend only over the lower end area of this pipe. The other stop strips 39 are firmly arranged on the inner wall of the sliding pipe 27; they extend essentially over the entire length of the sliding pipe. In this way, the two pipes 25 and 27 can be displaced axially relative to one another but are coupled to one another in rotationally locked manner so that the sliding pipe 27 is carried along by the coupling pipe 25 driven by means of the rotary drive 17 via the rotary member 16. During this operation, the sliding pipe 27 rotates in the lower area of the silo where the bulk material is in general compacted especially tightly. The rotary movement causes the sliding pipe 27 to break away from the surrounding bulk material and thus ensures that, during the lowering movement of the clearing device 5 from the raised position, the adhesive force of the sliding pipe 27 relative to the bulk material is so slight that it is overcome by the dead weight of the sliding pipe 27.

As FIG. 3 shows, the abovementioned rotary coupling between the two pipes 25 and 27 can be made in a simple manner such that in each case two stop strips 38 and 39 are provided on diametrically opposite sides of the pipes 25 and 27. According to FIG. 2, the sliding pipe 27 can also be guided in the lifting direction at its end lying beneath the silo base 10. For this purpose, several vertical guide rails 40 which are distributed over the periphery of the sliding pipe 27 are provided beneath the silo base 10, on which guide rails 40 is guided in rotationally fixed manner an annular guide shoe 41 or the like which is connected to the lower end of the sliding pipe 27 via a rotary connection 42.

In the embodiments according to FIGS. 1 and 2, the stand pipe 30 is of such a diameter that it pushes into the sliding pipe 27, which has the largest diameter of all three pipes. The stand pipe 30 has the smallest pipe diameter and can therefore also be pushed into the coupling pipe 25 having the medium diameter.

In the embodiment according to FIG. 4, the stand pipe 30 is designed as bellows 43 which, with their lower end, are connected to the adjoining piece 31 and, with their upper end, via a rotary connection 44, are connected to the lower end of the sliding pipe 27 and are thereby able to follow the lifting movements of the sliding pipe.

FIG. 5 shows a stand pipe 30 which is arranged in fixed manner between the delivery conveyor 32 and the silo base 10 and has a diameter which is larger than the diameter of the sliding pipe 27, so that the latter can plunge into the stand pipe from above.

It can also be seen from FIG. 5 that the telescopic fall pipe 24 can also have several sliding pipes, in the example shown two sliding pipes 27 and 27', with the upper sliding pipe 27' being arranged between the lower sliding pipe 27 and the coupling pipe 25. The sliding pipes 27 and 27' are coupled to one another via in each case a rotary coupling of the said type and in rotationally locked manner to the upper coupling pipe 25, so that all the sliding pipes 27 and 27' are driven by the rotary drive 17 via the coupling pipe 25 and the rotary member 16. On its inner wall, the upper sliding pipe 27' is provided with axial stop strips 39' which interact with the stop strips 38 of the coupling pipe 25. In addition, the sliding pipe 27', in the lower area on the outside, has short stop strips 38' which correspond to the stop strips 38 and which interact in the sense of a torque coupling with the stop strips 39 fixed to the inner wall of the lower sliding pipe 27.

Figure 6:
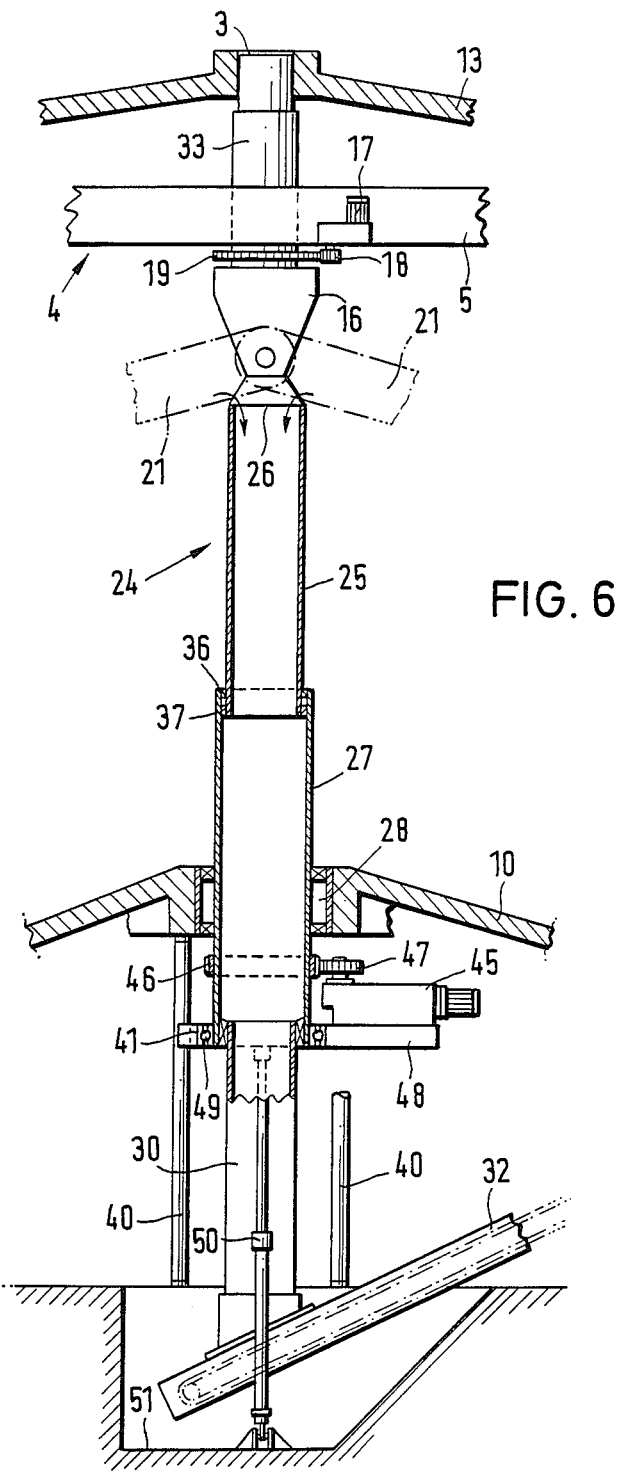
FIG. 6 shows, also in vertical section, a telescopic fall pipe with a rotary drive arranged beneath the silo base.

FIG. 6 shows an embodiment in which the rotary drive 45 for the sliding pipe 27 is arranged beneath the silo base 10. In this connection, the sliding pipe 27, on its outside, bears a toothed ring 46 with which a pinion 47 meshes which is driven by the rotary drive 45. The rotary drive 45 stands on a bracket 48 which is connected via a rotary connection 49 to the lower end of the sliding pipe 27 so that the rotary drive 45 participates in the lifting movements of the sliding pipe 27. The bracket 48 is guided on the guide columns 40, as a result of which a rotationally locked connection of the bracket 48 is achieved at the same time. The sliding pipe 27 can therefore be set in rotation independently of the rotary drive 17 of the clearing unit via the lower rotary drive 45. If the telescopic fall pipe 24 has several sliding pipes 27, for example two sliding pipes 27 and 27' according to FIG. 5, all the sliding pipes 27 can be driven by the rotary drive 45 arranged beneath the silo base 10, with the individual sliding pipes being coupled to one another in rotationally locked manner via the torque couplings described above. In the case of several sliding pipes inside the telescopic column, it is also possible to drive some of the sliding pipes via the upper rotary drive 17 of the clearing unit by rotationally locked coupling with the coupling pipe 25, and to drive the other sliding pipes 27 via the lower rotary drive 45.

As FIG. 6 shows, the sliding pipe 27 can also be supported beneath the silo base 10 by one or more lifting supports 50 which are supported on the subfloor 51. Lifting cylinders charged with a pressure medium are expediently used for the lifting supports 50, although positioning units with driven spindles or the like could also be provided. The lifting supports 50 support the weight of the sliding pipe 27, increased by the rotary drive 45. Instead, or even at the same time, they can be used for raising the sliding pipe 27, with the coupling pipe 25 retracted, in synchronism with the lifting movement of the clearing device when the clearing device 4 is being moved upwards out of its lowered position. Thus it is also possible to control the push-out sequence of the individual pipes of the telescopic fall pipe 24 during the upwards movement of the clearing device in the silo 1, with at the same time the sliding pipe 27 being prevented from having to be pulled up via the coupling pipe 25 by the stop of the flanges 36 and 37 of the clearing device. The lifting supports 50 can also be provided if the lower rotary drive 45 is dispensed with in favour of the upper rotary drive 17. In this case, the lifting cylinders 50 can be positioned according to FIG. 2 beneath the annular guide shoe 41.

We claim:

1. In an apparatus for emptying bulk materials from a silo or the like and having a vertical telescopic pipe means for conveying said bulk material downwardly through said silo, and clearing means for moving said bulk material from the surface thereof into said telescopic pipe means, said clearing means being rotatable about the axis of said telescopic pipe means and movable vertically in said silo to follow the changing surface level of said bulk material, said telescopic pipe means being adapted to follow the vertical movement of said clearing means by telescopic retraction and extension and comprising an axis, an upper pipe means coupled to said clearing means for vertical movement therewith, a pipe inlet associated with said upper pipe means to receive said bulk material from said conveying means, and at least one lower pipe means telescopic with respect to said upper pipe means, the improvement which comprises: said lower pipe means being rotatable about said axis by a rotary drive means; said upper pipe means being rotatably fixed about said axis relative to said lower pipe means through a rotary coupling; said rotary drive means being associated with said upper pipe means to rotate said lower pipe means through said upper pipe means and said rotary coupling; said clearing means being rotatable about said axis, and said rotary drive means being associated with said clearing means to rotate said upper pipe means through said clearing means; vertical guide means disposed at the walls of said silo, frame means carrying said clearing means and being vertically guided and rotatably fixed relative to said silo about said axis by said vertical guide means; and, said rotary drive means being carried on said frame means.

2. An apparatus as defined in claim 1, wherein said silo has a base means adjacent the lower end of said telescopic pipe means, and further comprising a pipe guide means below said base means for vertically guiding telescopic movement of said lower pipe member, said lower pipe member being freely rotatable with respect to said pipe guide means about said axis.

3. An apparatus as defined in claim 1, further comprising a lifting means, said lifting means being associated with said lower pipe means to move said lower pipe means vertically along said axis.

4. An apparatus as defined in claim 3, wherein said lifting means comprises a vertical post and hydraulic cylinder beneath said lower pipe means, said cylinder for driving said post to move said lower pipe means along said axis.

5. An apparatus as defined in claim 1, wherein said lower pipe means comprises at least two telescopic lower pipe members, said members being rotatably fixed relative to one another about said axis.

6. An apparatus as defined in claim 5, wherein said telescopic lower pipe members are rotatably fixed relative to one another at rotary couplings, said rotary couplings comprising a longitudinal rib fixed to the inner wall of the outer one of two telescopic members, and a lug fixed to the outer wall of the inner of two telescopic members and abutting against a said rib.

7. An apparatus as defined in claim 1, wherein said rotary coupling comprises a longitudinal rib fixed to the inner wall of said lower pipe means, and a lug fixed to the outer wall of said upper pipe means and abutting against said rib.

8. An appaaratus as defined in claim 1, wherein said lower pipe means is a single pipe member.

9. An apparatus as defined in claim 1, further comprising base means at the lower end of said silo, said base means having an opening for passage of said telescopic pipe means therethrough; a standpipe means; and a conveyor means for removal of said bulk material from said silo; said standpipe means comprising a vertical pipe member below said base means receiving said lower pipe means telescopically therein and permitting passage of said bulk material therethrough from said telescopic pipe means to said conveyor means.

10. An apparatus as defined in claim 1, further comprising a base means at the lower end of said silo, said base means having an opening for passage of said telescopic pipe means therethrough; a standpipe means; and a conveyor means for removal of said bulk material from said silo; said standpipe means comprising a bellows-like member below said lower pipe means coaxial with said lower pipe means and axiallly compressible under downward vertical movement of said lower pipe means, and permitting passage of said bulk material therethrough from said telescopic pipe means to said conveyor means.

11. An apparatus as defined in claim 1, further comprising means for reducing frictional contact between said bulk material and said telescopic pipe means and comprising radially extending means at the outer surface of said lower pipe means, said radially extending means causing turbulence within said bulk material in the region of said lower pipe means as said lower pipe means rotates about said axis.

12. An apparatus as defined in claim 11, wherein said radially extending means is disposed helically around said lower pipe means.

13. An apparatus as defined in claim 11, wherein said radially extending means comprises at least one longitudinal rib.

* * * * *

UNITED STATES PATENT AND TRADEMARK OFFICE
CERTIFICATE OF CORRECTION

PATENT NO. : 4,775,278
DATED : October 4, 1988
INVENTOR(S) : Gerhard Fischer, Günter Strö̈cker It is certified that error appears in the above-identified patent and that said Letters Patent is hereby corrected as shown below:

Title Page, Item [73], Assignee: "Gustav Schade Maschinenfabrik GmbH & Co.," should read --- Schade Fordertechnik GmbH & Co., ---

Signed and Sealed this

Twenty-third Day of May, 1989

Attest:

DONALD J. QUIGG

Attesting Officer

Commissioner of Patents and Trademarks